United States Patent Office 2,868,751
Patented Jan. 13, 1959

2,868,751
METHOD OF CURING SILICONE WATER REPELLENTS WITH CYCLOPENTADIENYL TRANSITION ELEMENT CATALYSTS AND AQUEOUS COMPOSITIONS OF SAME

Gordon C. Johnson, Hollis, and Maurice H. Jellinek, Williamsville, N. Y., assignors to Union Carbide Corporation, a corporation of New York No Drawing. Application January 18, 1956
Serial No. 559,768

14 Claims. (Cl. 260—29.2)

Organo metallic compounds such as soaps have been used as catalysts for curing thermosetting silicone resins. Such catalysts are, however, unsuitable for certain applications inasmuch as they do not become effective until the resin is heated. This is particularly undesirable in the treatment of paper with a silicone water repellent because of the inability of the paper to withstand the heating, and in the case of materials which are difficult or impossible to heat because of their area and bulk such as the surfaces of limestone building blocks. For uses such as these it is desirable, even necessary, to have curing catalysts for silicone water repellents which are effective at ordinary temperatures such as room temperatures.

In Nature, volume 168, December 15, 1951, page 1039, Kealy and Pauson disclosed a new compound, bis-cyclopentadienyl iron, having the formula $(C_5H_5)_2Fe$. Since then it has been found that other compounds of this type exist. These compounds in general have the formula $$R_2MX'_mX_n$$

In this formula R is a cyclopentadienyl radical or a substituted cyclopentadienyl radical such as a lower alkyl substituted cyclopentadienyl radical (a methyl or ethyl substituted cyclopentadienyl radical) or an aryl ubstituted cyclopentadienyl radical such as a phenyl cyclopentadienyl radical. M is a transition element.

The term "transition element" applies to those elements of the periodic system which have an inner electron shell present but not filled to capacity. Generally speaking these unfilled shells are the "d" and "f" shells, the d shells including the 3d shell found in the elements Sc, Ti, V, Cr, Mn, Fe, Co, Ni; the 4d shell found in Y, Zr, Nb, Mo, Tc, Ru, Rh, and Pd; and the 5d shell found in La, Hf, Ta, W, Re, Os, Ir, and Pt. The f shells are the 4f shell which unfilled gives rise to the lanthanide or rare earth elements and the 5f shell which unfilled gives rise to the actinide series.

In the formula m may be 0 or 1, and n may be 0, 1 or 2, and X and X' are halogens of atomic numbers greater than 9, namely Cl, Br, or I, and may be the same or different halogens.

These compounds may be made by the reaction of a cyclopentadienyl Grignard reagent with a transition element halide or by way of the reaction of sodium cyclopentadiene or the sodium derivative of a substituted cyclopentadiene as disclosed in application Serial No. 381,970, of Lynch and Brantley and assigned to the same assignee as the present application.

We have discovered that these metallic bis-cyclopentadienyl compounds are superior catalysts for curing organic solvent soluble silicone water repellents and are effective at ordinary (e. g. room) temperatures.

In particular we have discovered that these compounds are highly effective catalysts for the cure of silicone water repellents which are soluble in organic solvents, and for water emulsions of such organic solvent soluble silicone water repellents.

A preferred group of catalysts is found in the compounds of the formula $R_2MX_n$. In this formula M is a transition element from the 3d, 4d or 5d orbital series of transition elements and n may be 0, 1 or 2. Of these, the Fe, Ti, and Zr compounds are preferred and the Zr compounds, $R_2ZrX_2$, are especially preferred.

These catalysts may be employed with any organic solvent soluble siloxane. However, they are especially useful when employed with the lower alkyl polysiloxanes such as the methyl, ethyl and amyl polysiloxanes. Such water repellents are well known and generally speaking are partially hydrolized and condensed silanes which still contain some alkoxy or hydroxyl groups. Other particularly useful organic solvent soluble water repellents which can be employed in the practice of this invention are the lower alkyl tris(2-methoxyethoxy)silanes such as methyl, ethyl and amyl tris(2-methoxyethoxy)silane.

In the practice of our invention we add enough of the bis-cyclopentadienyl transition element compound to the solution of the silicone water repellent in an organic solvent to give a weight percent concentration of transition element in the solution of from 0.1 to 10 percent based on the weight of contained silicone resin in the solution. A preferred range of concentration of the transition element is from 0.5 to 5 weight percent.

By contained silicone resin or contained resin solids we mean the weight of fully condensed resin corresponding to the amount of silane or polysiloxane in the solution or emulsion employed. In illustration; if the silane employed is ethyl tris(2-methoxyethoxy)silane, the chemical formula being $C_2H_5Si(OC_2H_4OCH_3)_3$, the fully condensed silane has the formula $[C_2H_5SiO_{3/2}]_x$, $x$ indicating the number of units in the final polymer. The ratio of molecular weights $$[C_2H_5SiO_{3/2}]_1/C_2H_5Si(OC_2H_4OCH_3)_3$$

equals 81/282 showing that the fully condensed resin is 28.7 percent of the weight of the silane, or in other words a solution containing 100 grams of ethyl tris(2-methoxyethoxy)silane corresponds to 28.7 grams of contained silicone resin solids.

The catalysts may be employed in organic solvent solutions of the polysiloxane water repellent and in their water emulsions. In forming the solution containing the catalyst a practical method is to first add the bis-cyclopentadienyl transition element catalyst to the siloxane and then dilute the siloxane-catalyst solution to the desired solids content for application as a water repellent. Alternatively, the catalyst may be first dissolved in the solvent and then admixed with the silicone water repellent or with the emulsion thereof. The following Table I, illustrates the solubility of these catalysts in organic solvents.

TABLE I

Solvents solution of bis-cyclopentadienyl transition element halides

| Compound | Solvent | Wt. Percent Transition Element in Solution |
|---|---|---|
| $(C_5H_5)_2ZrCl_2$ | Acetone | 3.6 |
| $(C_5H_5)_2TiBrCl$ | Dimethyl "Cellosolve" | 1 |
| $(CH_3C_5H_4)_2Fe$ | Benzene | 6.3 |
| $(C_5H_5)_2CoCl$ | Ethanol | 6 |

The solvents shown in Table I are all suitable solvents for the silicone water repellents as well as for the bis-cyclopentadienyl compounds. However, such solvents as mineral spirits and aromatic hydrocarbon solvents are also suitable and the lower alkyl substituted benzenes, in particular toluene, are especially preferred.

Solutions of the catalysts in an ethyl polysiloxane water repellent, a partially hydrolyzed and condensed ethyl polysiloxane with an average molecular weight of about 8,000 (Linde C–25) were made up to contain 1 percent of the transition element based on the weight of polysiloxane. These solutions were then diluted to a solids percentage weight of 3 percent in mineral spirits and applied to limestone blocks. Table II indicates the results of using various bis-cyclopentadienyl transition element catalysts in the ethyl polysiloxane water repellent. In obtaining the data in this table the contact angle was determined visually with a contact angle of greater than 90° indicated by "good."

TABLE II

*Catalytic effect of bis-cyclopentadienyl transition element halides on water repellents*

| Water Repellent (3 percent Siloxane or equivalent) | Transition Element | Water Drops on Limestone Contact Angle |
|---|---|---|
| Linde C–25 (Ethyl polysiloxane) | Zr | Good. |
|  | Ti | Good. |
|  | Fe | Good. |
|  | Co | Poor. |
| Linde Y–1059—Ethyl tris(2-methoxyethoxy) silane. | Zr | Fair. |

Generally speaking an increase in the concentration of the catalyst or an increased amount of resin solids within the described ranges in the solution applied results in improved water repellency when the repellent is applied to limestone. Table III shows the improved water repellency with increased catalyst concentration and increased resin solids in total immersion tests on limestone blocks. Table III also shows that bis-cyclopentadienyl zirconium dichloride is not in itself a water repellent.

TABLE III

*Percent water absorption of Alabama limestone during total immersion after treatment with Linde C–25 (ethyl polysiloxane) water repellent catalyzed with bis-cyclopentadienyl zirconium dichloride*

| Wt. Percent Zr in Solution | Wt. Percent Resin Solids in Solution | | |
|---|---|---|---|
| | 0 | 3 | 5 |
| | Percent Water Absorbed | | |
| 0 | 5.6 | 4.8 | ------ |
| 0.015 | ------ | 5.1 | 4.0 |
| 0.03 | ------ | 3.0 | 3.8 |
| 0.09 | ------ | 2.6 | 2.3 |
| 3.59 | 5.4 | ------ | ------ |

These catalysts may also be used with polysiloxane water repellents applied to paper. Kraft paper (50 lb.) was dipped in the catalyzed solution and air dried for 24 hours. When thus treated the paper has improved wet strength and non-wetting behavior toward water. The following, Table IV, illustrates this.

TABLE IV

*Bis-cyclopentadienyl zirconium dichloride catalyzed ethyl polysiloxane water repellent (Linde C–25) on kraft paper (1 percent zirconium based on contained resin solids)*

| Resin conc. | Visual Surface Water Repellency | Immersion Time (Minutes) | Percent Tensile Strength Retention Compared to Untreated Paper | | Relative Water Absorption (Percent) |
|---|---|---|---|---|---|
| | | | Dry | Wet | |
| 1 | Good | 10 | 39 | 56 | 84 |
| 3 | Good | 10 | 102 | 172 | ------ |
| 3 | Good | 2 | 102 | 161 | ------ |

By comparison when a comparable amount of zirconium in the form of "Zirco drier" (Advance Solvents and Chemical Corp., New York, N. Y.), was used as a catalyst the surface water repellency was only fair to poor.

We have successfully treated other types of paper with the bis-cyclopentadienyl zirconium dichloride catalyzed water repellents. This is indicated in Example I.

EXAMPLE I

Gasoline filters made of paper bonded with phenolic resin were immersed in a 5 weight percent solution of ethyl polysiloxane water repellent in toluene containing 1 percent zirconium (based on resin solids) in the form of bis-cyclopentadienyl zirconium dichloride. After immersion the filters were air dried and cured at 125° C. for 15 minutes. The filters so treated absorbed only 6 to 7 percent water after 15 minutes' immersion as contrasted with failure of untreated filters in the same test with adsorption of 114 percent water.

In another test the treated filters were extracted with boiling water for 24 hours. After this test the percent water absorption of the treated filters was unchanged.

Our catalysts are also useful in catalyzing water emulsions of polysiloxane water repellents. In preparing catalyst solutions for use in water emulsions the catalyst should be dissolved in an organic solvent which is not soluble in water. If the solvent is water soluble such as acetone or dimethyl "Cellosolve" ($CH_3OC_2H_4OCH_3$) the catalyst is precipitated on addition to the siloxane emulsion and gelation results. When the solvent is not soluble in water, as is benzene, the emulsion remains stable on the addition of the catalyst and gelation is eliminated. Example II illustrates the preparation of a water emulsion of a polysiloxane water repellent catalyzed with a bis-cyclopentadienyl transition element compound.

EXAMPLE II

The following materials were used to prepare an emulsion:

2.5 parts oleic acid
45 parts of 33 weight percent solution of Linde C–25 (ethyl polysiloxane) in mineral spirits
4.5 parts of triethanolamine
60 parts of water The stirring was accomplished with a high speed stirrer. The oleic acid and resin solution was blended together. The triethanolamine was dissolved in the water and added to the solution thus formed with rapid stirring. After the addition of about one-fourth of the water solution a thick paste formed and then became thinner as more water was added. After all the water solution had been added 10 grams of saturated solution of bis-cyclopentadienyl zirconium dichloride in benzene was added to the emulsion. This gave a catalyst concentration (calculated as Zr) in the emulsion of about 1 percent of the weight of the ethyl polysiloxane employed. The catalyst solution may be added by gently shaking the benzene solution and the emulsion together; vigorous stirring is not necessary.

The emulsion so formed may be further diluted immediately or additional water may be added later. This emulsion is stable and may be filtered and applied to paper by dipping or spraying. A practical concentration of resin solids in the emulsion when used on paper is 1 percent.

Emulsions so prepared have a shelf life at least two months.

EXAMPLE III

An emulsion was prepared by the method described in Example II. The emulsion was divided into two parts, "A" and "B." Part "A" was catalyzed with 1 percent Zr based on siloxane resin content and part "B" with 0.1 percent Zr based on siloxane resin content.

Table V shows the results when diluted portions of the catalyzed emulsion were applied to Kraft paper by dipping.

TABLE V

| Emulsion | Dilution (percent resin) | Visual Resistance to Wetting |
|---|---|---|
| A | 1.0 | Good. |
| A | 0.5 | Fair. |
| B | 1.0 | Good. |
| B | 0.5 | Good. |
| Blank | | Poor. |

The organic solvent solutions of the polysiloxane water repellents and bis-cyclopentadienyl transition element catalysts are unstable toward light and have a limited shelf life when stored in clear glass bottles. However, when the solutions are stored in brown bottles the catalyzed solutions are unaffected after storage times greater than three months.

Also encompassed within the scope of the present invention are the new compositions comprised of solutions of bis-cyclopentadienyl transition element compounds in organic solvent soluble silicone water repellents, these compositions being useful as a means of storing and transporting the water repellents and requiring only the addition of the solvent to provide a water repellent ready for use.

Such new compositions are comprised of an organic solvent soluble silicone water repellent such as a lower alkyl polysiloxane illustrative of which are methyl, ethyl and amyl polysiloxanes and lower alkyl tris(2-methoxyethoxy) silanes such as methyl, ethyl and amyl tris(2-methoxyethoxy) silane and from 0.1 to 10 percent, preferably from 0.5 to 5 percent, by weight of the contained resin solids in the water repellent of transition element in the form of bis-cyclopentadienyl transition element compounds.

Other compositions within the scope of the present invention are solutions comprised of the silicone water repellents as heretofore described and the bis-cyclopentadienyl transition element compound in organic solvents. The preferred organic solvents are the aromatic hydrocarbon solvents, preferably the lower alkyl substituted benzenes, particularly toluene. These compositions are comprised of an organic solvent solution of a silicone water repellent and bis-cyclopentadienyl transition element compound, preferably bis-cyclopentadienyl zirconium dichloride. The silicone water repellent (preferably a lower alkyl polysiloxane or a lower alkyl tris(2-methoxyethoxy)silane is present in an amount sufficient to provide weight of resin solids contained in the water repellent of from 1 to 10 percent, preferably from 3 to 4 percent, of the weight of the solution and the concentration of bis-cyclopentadienyl transition element compound sufficient to provide from 0.1 to 10 percent, preferably 0.5 to 5 percent of the weight of the contained resin solids in the silicone water repellent.

What is claimed is:

1. The method for curing organic solvent-soluble silicone water repellents selected from the group consisting of lower alkyl polysiloxanes and lower alkyl tris(2-methoxyethoxy) silanes which comprises mixing a bis-cyclopentadienyl compound of a $d$ orbital transition element selected from the group consisting of the $d$ orbital transition elements of group IVB of the Periodic Table of the Elements, iron, and cobalt with said silicone water repellent, said bis-cyclopentadienyl compound being added in an amount sufficient to give a concentration of from 0.1 to 10 percent by weight of the contained resin solids in the water repellent of the transition element present in said bis-cyclopentadienyl compound.

2. The method for curing organic solvent-soluble silicone water repellents selected from the group consisting of lower alkyl polysiloxanes and lower alkyl tris(2-methoxyethoxy) silanes which comprises mixing bis-cyclopentadienyl iron with said silicone water repellent, said bis-cyclopentadienyl iron being added in an amount sufficient to give a concentration of from 0.1 to 10 percent by weight of the contained resin solids in the water repellent of iron.

3. The method for curing organic solvent-soluble silicone water repellents selected from the group consisting of lower alkyl polysiloxanes and lower alkyl tris(2-methoxyethoxy) silanes which comprises mixing bis-cyclopentadienyl titanium bromide chloride with said silicone water repellent, said bis-cyclopentadienyl titanium bromide chloride being added in an amount sufficient to give a concentration of from 0.1 to 10 percent by weight of the contained resin solids in the water repellent of titanium.

4. The method for curing organic solvent-soluble silicone water repellents selected from the group consisting of lower alkyl polysiloxanes and lower alkyl tris(2-methoxyethoxy) silanes which comprises mixing bis-cyclopentadienyl zirconium dichloride with said silicone water repellent, said bis-cyclopentadienyl zirconium dichloride being added in an amount sufficient to given a concentration of from 0.1 to 10 percent by weight of the contained resin solids in the water repellent of zirconium.

5. The method for curing organic solvent-soluble silicone water repellents selected from the group consisting of lower alkyl polysiloxanes and lower alkyl tris(2-methoxyethoxy) silanes which comprises mixing a bis-cyclopentadienyl transition element compound of the formula $R_2MX'_mX_n$, wherein R is selected from the group consisting of cyclopentadienyl radicals, lower alkyl substituted cyclopentadienyl radicals and aryl substituted cyclopentadienyl radicals, M is a $d$ orbital transition element selected from the group consisting of the $d$ orbital transition elements of group IVB of the Periodic Table of the Elements, iron, and cobalt, X' and X are halogen atoms of atomic number greater than 9, $m$ is selected from the group consisting of 0 and 1, and $n$ is a number selected from the group consisting of 0, 1 and 2, with said silicone water repellent, said bis-cyclopentadienyl transition element compound being added in an amount sufficient to give a concentration of from 0.1 to 10 percent by weight of the contained resin solids in the water repellent of the transition element present in said bis-cyclopentadienyl compound.

6. The method for curing organic solvent-soluble silicone water repellents selected from the group consisting of lower alkyl polysiloxanes and lower alkyl tris(2-methoxyethoxy) silanes which comprises mixing a bis-cyclopentadienyl transition element compound of the formula $R_2MX_n$, wherein R is a cyclopentadienyl radical, M is a $d$ orbital transition element selected from the group consisting of the $d$ orbital transition elements of group IVB of the Periodic Table of the Elements, iron and cobalt, X is a halogen atom of atomic number greater than 9, and $n$ is a number selected from the group consisting of 0, 1 and 2, with said silicone water repellent, said bis-cyclopentadienyl transition element compound being added in an amount sufficient to give a concentration of from 0.1 to 10 percent by weight of the contained resin solids in the water repellent of the transition element present in said bis-cyclopentadienyl compound.

7. As new compositions of matter, a solution comprising an organic solvent-soluble silicone water repellent selected from the group consisting of lower alkyl polysiloxanes and lower alkyl tris(2-methoxyethoxy) silanes and from 0.1 to 10 percent by weight, based on the weight of contained silicone resin in the solution, of a transition element said transition element being present as bis-cyclopentadienyl transition element compound, and said transition element being selected from the group consisting of the $d$ orbital transition elements of group IVB of the Periodic Table of the Elements, iron, and cobalt.

8. As new compositions of matter, a solution comprising an organic solvent-soluble silicone water repellent selected from the group consisting of lower alkyl polysiloxanes and lower alkyl tris(2-methoxyethoxy) silanes and from 0.1 to 10 percent by weight, based on the weight of contained silicone resin in the solution, of iron, said iron being present as bis-cyclopentadienyl iron.

9. As new compositions of matter, a solution comprising an organic solvent-soluble silicone water repellent selected from the group consisting of lower alkyl polysiloxanes and lower alkyl tris(2-methoxyethoxy) silanes and from 0.1 to 10 percent by weight, based on the weight of contained silicone resin in the solution, of titanium, said titanium being present as bis-cyclopentadienyl titanium bromide chloride.

10. As new compositions of matter a solution comprising an organic solvent-soluble silicone water repellent selected from the group consisting of lower alkyl polysiloxanes and lower alkyl tris(2-methoxyethoxy) silanes and from 0.1 to 10 percent by weight, based on the weight of contained silicone resin in the solution, of zirconium, said zirconium being present as bis-cyclopentadienyl zirconium dichloride.

11. As new compositions, a water-emulsified organic solvent-soluble lower alkyl polysiloxane water repellent in admixture with from 0.1 to 10 percent by weight, based on the weight of contained silicone resin in the emulsion, of transition element, said transition element being selected from the group consisting of the $d$ orbital transition elements of group IVB of the Periodic Table of the Elements, iron, and cobalt and present in admixture with emulsified silicone water repellent as a solution of bis-cyclopentadienyl transition element compound in a water-insoluble hydrocarbon solvent.

12. As new compositions, a water-emulsified organic solvent-soluble lower alkyl polysiloxane water repellent in admixture with from 0.1 to 10 percent by weight, based on the weight of contained silicone resin in the emulsion, of iron, said iron being present in admixture with said emulsified silicone water repellent as a solution of bis-cyclopentadienyl iron in a water-insoluble hydrocarbon solvent.

13. As new compositions, a water-emulsified organic solvent-soluble lower alkyl polysiloxane water repellent in admixture with from 0.1 to 10 percent by weight, based on the weight of contained silicone resin in the emulsion, of titanium, said titanium being present in admixture with said emulsified silicone water repellent as a solution of bis-cyclopentadienyl titanium chloride bromide in a water-insoluble hydrocarbon solvent.

14. As new compositions, a water-emulsified organic solvent-soluble lower alkyl polysiloxane water repellent in admixture with from 0.1 to 10 percent by weight, based on the weight of contained silicone resin in the emulsion, of zirconium, said zirconium being present in admixture with said emulsified silicone water repellent as a solution of bis-cyclopentadienyl zirconium dichloride in a water-insoluble hydrocarbon solvent.

No references cited.